United States Patent
Le Van-Jodin et al.

(10) Patent No.: US 9,991,555 B2
(45) Date of Patent: Jun. 5, 2018

(54) SOLID ELECTROLYTE FOR A MICROBATTERY

(71) Applicant: Commissariat A L'Energie Atomique et aux Energies Alternatives, Paris (FR)

(72) Inventors: Lucie Le Van-Jodin, Nancy (FR); Arnaud Claudel, Laneuville devant Nancy (FR); Steve Martin, Saint Sauveur (FR); Christophe Secouard, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 215 days.

(21) Appl. No.: 14/695,577

(22) Filed: Apr. 24, 2015

(65) Prior Publication Data

US 2015/0311562 A1    Oct. 29, 2015

(30) Foreign Application Priority Data

Apr. 24, 2014   (FR) ..................... 14 53710

(51) Int. Cl.
    H01M 10/0562   (2010.01)
    H01M 10/04     (2006.01)
    H01M 10/052    (2010.01)
    H01M 4/38      (2006.01)
    H01M 4/58      (2010.01)

(52) U.S. Cl.
    CPC ... *H01M 10/0562* (2013.01); *H01M 10/0436* (2013.01); *H01M 10/052* (2013.01); *H01M 4/386* (2013.01); *H01M 4/5815* (2013.01); *H01M 2300/0071* (2013.01)

(58) Field of Classification Search
    None
    See application file for complete search history.

(56) References Cited

U.S. PATENT DOCUMENTS

| | | | |
|---|---|---|---|
| 5,338,625 A | 8/1994 | Bates et al. | |
| 6,214,061 B1 * | 4/2001 | Visco | H01M 4/04 29/623.5 |
| 2004/0137330 A1 | 7/2004 | Lee et al. | |
| 2004/0209159 A1 * | 10/2004 | Lee | H01M 4/134 429/137 |
| 2007/0037059 A1 * | 2/2007 | Salot | H01M 4/131 429/304 |

(Continued)

OTHER PUBLICATIONS

French Preliminary Search Report dated Jan. 9, 2015 in French Application 14 53710, filed on Apr. 24, 2014 ( with English Translation of Categories of Cited Documents and Written opinion).
B. Wang et al. "Synthesis, Crystal Structure, and Ionic Conductivity of a Polycrystalline Lithium Phosphorus Oxynitride with the γ-Li$_3$PO$_4$ Structure", Journal of Solid State Chemistry, 115, XP-002420380, 1995, 11 pages.

(Continued)

*Primary Examiner* — Barbara L Gilliam
*Assistant Examiner* — Adam A Arciero
(74) *Attorney, Agent, or Firm* — Oblon, McClelland, Maier & Neustadt, L.L.P.

(57) ABSTRACT

A solid electrolyte including a layer of Li$_x$PO$_y$, free from nitrogen, with 3.6≤x≤6.3 and 1.5≤y≤4, and the ionic conductivity of which is greater than or equal to 10$^{-5}$ S/cm. A microbattery including a layer of solid electrolyte.

14 Claims, 5 Drawing Sheets

(56) References Cited

U.S. PATENT DOCUMENTS

2011/0305958 A1* 12/2011 Kuriki .................... H01G 9/025
429/311
2014/0072727 A1* 3/2014 Hayden .................. C23C 14/24
427/570

OTHER PUBLICATIONS

J. B. Bates et al. "Fabrication and characterization of amorphous lithium electrolyte thin films and rechargeable thin-film batteries", Journal of Power Sources, vol. 43-44, XP-002435988, 1993, 8 pages.
B. Wang et al. "Ionic conductivities and structure of lithium phosphorus oxynitride glasses", Journal of Non-Crystalline Solids, vol. 183, 1995, 10 pages.
Y. Hamon et al. "Influence of sputtering conditions on ionic conductivity of LiPON thin films", Solid State Ionics, 2005, 5 pages.
B. Fleutot et al. "Investigation of the local structure of LiPON thin films to better understand the role of nitrogen on their performance", Solid State Ionics, 2011, 8 pages.
Naoki Suzuki et al. "Electrochemical properties of LiPON films made from a mixed powder target of $Li_3PO_4$ and $Li_2O$", Thin Solid Films, 2012, 5 pages.
Francisco Munoz et al "Increased electrical conductivity of LiPON glasses produced by ammonolysis", Solid State Ionics 179, 2008, 6 pages.

\* cited by examiner

SOLID ELECTROLYTE FOR A MICROBATTERY

TECHNICAL FIELD

The present invention concerns a solid electrolyte for microbatteries, a microbattery comprising said solid electrolyte and a method for manufacturing said electrolyte.

The invention will find its application in the field of microbatteries and in particular for "all-solid-state" microbatteries for improving their power. It can also find its application in other fields using solid electrolytes and in particular in the field of electrochromes. This is because thin-film electrochromes can use the same materials as microbatteries.

PRIOR ART

"All-solid-state" microbatteries are electrochemical energy-storage components of small size. Typically with a thickness of less than 15 μm. They are manufactured via technologies borrowed from microelectronics. The specificity of "all-solid-state" batteries is to have a solid electrolyte.

The electrolyte most commonly used in microbatteries is LiPON. This is an amorphous material, composed of lithium, phosphorus, oxygen and nitrogen. This compound is described in the publication by Bates et al. J. Pow. Sou. 43-44 (1993) 103-110 and in the document U.S. Pat. No. 5,338,625. The precise compound described by Bates is $Li_xPO_yN_z$ with x~2.8, 0.16<z<0.46, 2y=3z~7.8. Its conductivity is given as $1.6 \times 10^{-6}$ S/cm.

Numerous publications show the important role of the chemical composition of the of the electrolyte on the performances of the microbatteries. The parameter most unanimously accepted is that increasing the N/P ratio increases the ionic conductivity. Bates shows that $Li_{2.7}PO_{3.9}$ has a conductivity of $7.10^{-8}$ S/cm whereas $Li_{2.9}PO_{3.3}N_{0.46}$ has a conductivity of $3.3 \times 10^{-6}$ S/cm.

However, it is still necessary to improve the performance of microbatteries in order to satisfy novel applications thereof, in particular RFID tags, chip cards, memory cards, etc.

DISCLOSURE OF THE INVENTION

The present invention for this purpose proposes a solid electrolyte comprising a film comprising $Li_xPO_y$ not comprising nitrogen and wherein the lithium and oxygen levels are controlled so as to be such that $3.6 \leq x \leq 6.3$ and $1.5 \leq y \leq 4$.

Advantageously, it has been observed that a solid electrolyte according to the invention has an ionic conductivity greater than or equal to $10^{-5}$ S/cm.

Increasing the ionic conductivity of the electrolyte essentially improves the power maintenance of the batteries. It is possible to work with high currents without losing in terms of capacity. The invention thus significantly improves the performances of microbatteries. Optionally, the invention may also have at least any one of the following features taken separately or in combination.

According to another aspect, the invention relates to a microbattery comprising at least one layer of electrolyte as described above. A microbattery according to the invention has improved performances.

According to another aspect, the invention concerns a method for manufacturing an electrolyte as described above, comprising a step of physical vapour deposition using an $Li_3PO_4$ target sputtered under nitrogen so as to obtain a layer comprising $Li_xPO_y$, free from nitrogen, with $3.6 \leq x \leq 6.3$ and $1.5 \leq y \leq 4$. This method advantageously makes it possible not to deposit nitrogen in the layer of electrolyte.

BRIEF DESCRIPTION OF THE FIGURES

The aims, objects, features and advantages of the invention will emerge more clearly from the detailed description of an embodiment thereof that is illustrated by the following accompanying figures, in which:

FIG. 1bis: conventional structure of a microbattery with a protective layer between the electrolyte and the anode.

DETAILED DISCLOSURE OF PARTICULAR EMBODIMENTS

Before beginning a detailed review of embodiments of the invention, optional features, which may optionally be used in association or alternatively, are stated below.

It is stated first of all that the invention relates to a solid electrolyte comprising a layer comprising $Li_xPO_y$, free from nitrogen, with $3.6 \leq x \leq 6.3$ and $1.5 \leq y \leq 4$.

Advantageously, x and y are such that the ionic conductivity is greater than or equal to $10^{-5}$ S/cm.

Advantageously, the Li/O ratio in the layer comprising $Li_xPO_y$ is greater than 1, advantageously greater than or equal to 1.5.

Advantageously the layer comprising $Li_xPO_y$ comprises another element in a quantity less than 2.5%, advantageously less than 1%.

Advantageously, the layer comprising $Li_xPO_y$ is exclusively a layer of $Li_xPO_y$.

Advantageously, the layer comprising $Li_xPO_y$ is such that x is equal to 4 and y is equal to 2.6.

Advantageously, the layer comprising $Li_xPO_y$ is such that x is equal to 4 and y is equal to 2.3.

Advantageously, Li/P ratio is greater than or equal to 3.6.

Advantageously the O/P ratio is less than or equal to 4.

Advantageously, the electrolyte is amorphous.

Advantageously, the electrolyte comprises a protective layer protecting the layer comprising $Li_xPO_y$.

Advantageously, the protective layer has a minimum thickness of 0.5 nm and a maximum thickness of 35% of the thickness of a layer comprising $Li_xPO_y$.

Advantageously, the protective layer is a solid electrolyte.

Advantageously, the protective layer is a solid electrolyte chosen from LiPON or $Li_zSiO_w$.

Advantageously, the electrolyte is dual layer, preferentially $Li_xPO_y/LiPON$ or $Li_xPO_y/Li_zSiO_w$.

Advantageously the protective layer is chosen from $Al_2O_3$, Si or $Li_2O$.

Another subject matter of the invention is a microbattery comprising at least one solid electrolyte layer as described above.

Advantageously, the microbattery comprises a protective layer protecting the layer comprising $Li_xPO_y$.

Advantageously, the protective layer has minimum thickness of 0.5 nm and a maximum thickness of 35% of the thickness of the layer comprising $Li_xPO_y$.

Advantageously, the protective layer is a solid electrolyte.

Advantageously, the protective layer is a solid electrolyte chosen from LiPON and $Li_zSiO_w$.

Advantageously, the electrolyte is dual layer, preferentially $Li_xPO_y/LiPON$ or $Li_xPO_y/Li_zSiO_w$.

Advantageously, the protective layer is chosen from $Al_2O_3$, Si or $Li_2O$.

Another subject matter of the invention is a method for manufacturing an electrolyte as described above comprising a step of physical vapour deposition (PVD) using an $Li_3PO_4$ target sputtered under nitrogen so as to obtain a layer comprising $Li_xPO_y$, free from nitrogen, with $3.6 \leq x \leq 6.3$ and $1.5 \leq y \leq 4$.

Advantageously, the sputtering of the target is effected without a magnetron.

Figure 1:
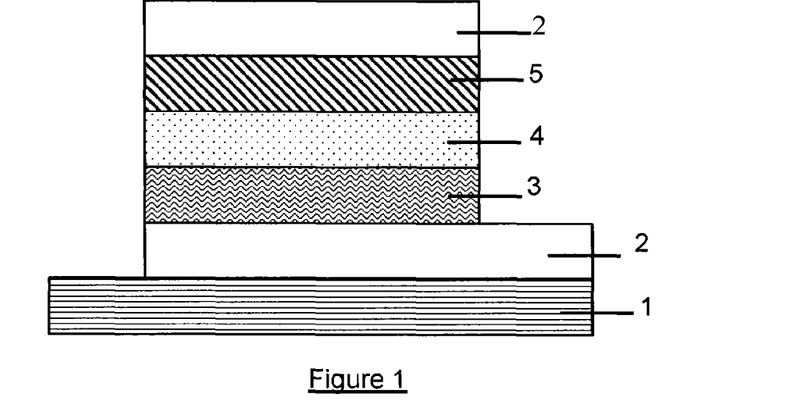
FIG. 1: conventional structure of an "all-solid-state" microbattery.

A microbattery as illustrated in FIGS. 1 and 1bis is produced by the successive stacking of the following layers:
  a substrate 1
  a current collector 2
  a cathode material 3
  an electrolyte material 4 with optionally a protective layer 6
  an anode material 5
  a current collector 2

The specificity of "all-solid-state" batteries is to have a solid electrolyte 4. The role of this electrolyte 4 is to transport the lithium ions from one electrode of the battery to another while blocking the passage of electrons. The method most commonly used for producing this electrolyte 4 is cathodic sputtering of a target under vacuum.

The operating principle of a microbattery is based on the principle of oxidation-reduction of lithium ions passing between an anode material 5 and a cathode material 3 through the electrolyte 4. The electrons exchanged during these reactions pass through an external circuit thereby charging or discharging the battery.

The addition of lithium in the structure can be done either by direct employment of a metallic lithium layer as the anode 5 and in this case a "lithium battery" is spoken of, or by the use of at least one lithiated electrode material 4 and in this case an "Li-ion battery" is spoken of.

According to the invention, a solid electrolyte 4 comprising a layer comprising $Li_xPO_y$ with $3.6 \leq x \leq 6.3$ and $1.5 \leq y \leq 4$ has particularly interesting conductivity properties. The values x and y are molar values. These values are preferentially determined by RBS (Rutherford Backscatter Spectrometry) and NRA (Nuclear Reaction Analysis) chemical composition measurement.

The layer comprising LixPOy according to the invention does not contain nitrogen. However, the ionic conductivity is very appreciable greater than the ionic conductivity of the electrolytes of the prior art. Preferentially, the indices x and y are chosen so that the electrolyte has an ionic conductivity greater than or equal to $10^{-5}$ S/cm. Advantageously, the electrical conductivity is for its part substantially identical.

Figure 2A:
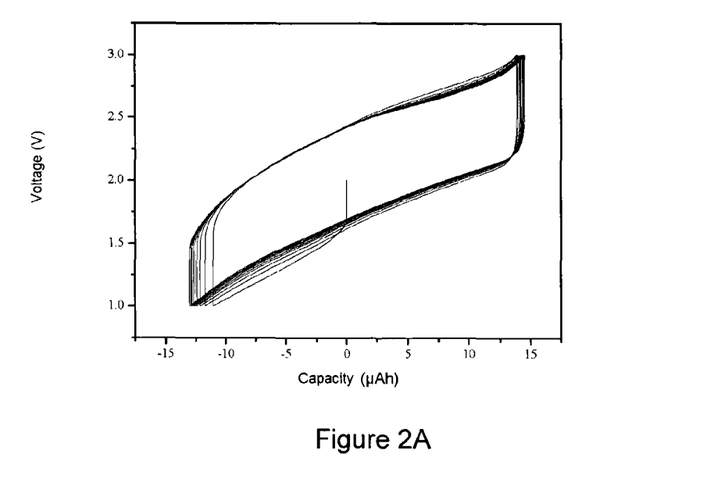
FIGS. 2A-B: differences in potential for charging and discharging cycles of batteries with high internal resistance (A), with low internal resistance (B).
Figure 2B:
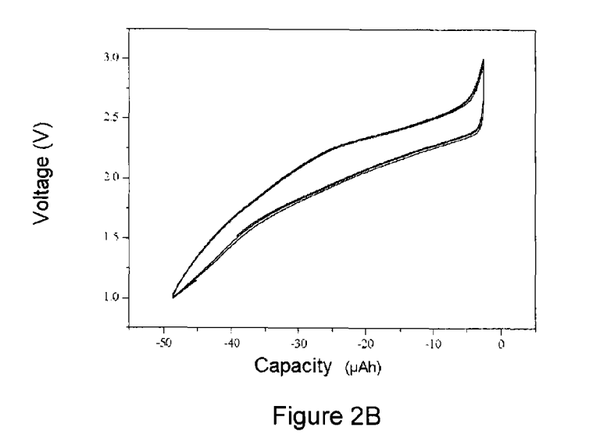

One of the characteristics of the batteries is their internal resistance, and it is this that will determine the behaviour of the battery under high charging or discharging currents. This resistance is highly dependent on the ionic conductivity of the electrolyte. With an electrolyte the ionic conductivity of which is increased, it is possible to work at higher currents without losing in terms of capacity. The internal resistance is higher and the difference in potential, passing from the charging regime to the discharging regime, or vice versa, is high, and therefore the potential range actually cycled will be lower. Differences in potential are illustrated for battery charging and discharging cycles with high resistance in FIG. 2a and low resistance in FIG. 2b.

According to one possibility, the layer comprising $Li_xPO_y$ contains another element in a quantity below 2.5%, advantageously below 1% molar. This element is for example boron. It may depend on the targets used for manufacturing the electrolyte. This element is not nitrogen. As stated alternatively, the solid electrolyte according to the invention comprises a layer of $Li_xPO_yA_\alpha$ with A not being nitrogen and with $0 \leq \alpha \leq 2.5$.

Preferentially, the indices x and y are chosen so that the Li/O ratio is greater than 1, advantageously greater than or equal to 1.5. By way of preferred example, the material is $Li_4PO_{2.6}$.

The solid electrolyte according to the invention is amorphous.

Figure 3:
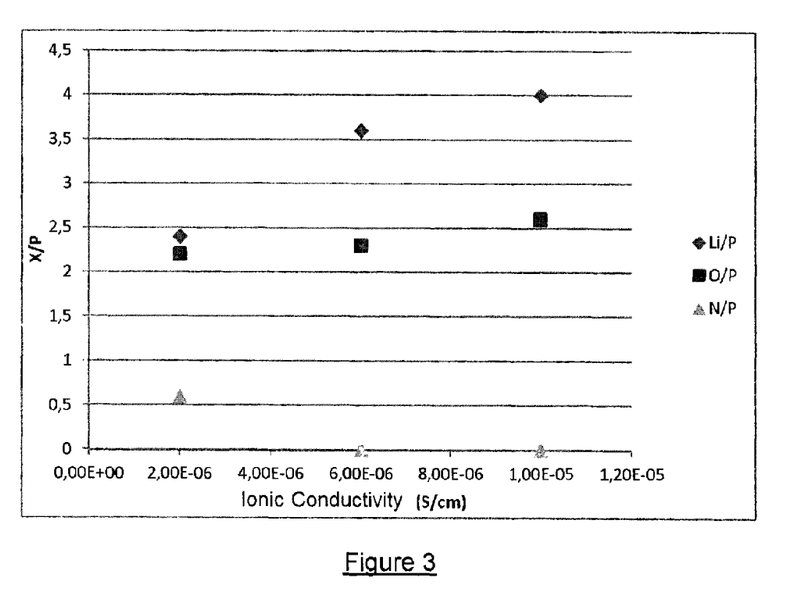
FIG. 3: composition of LiPO-1 and LiPO-2 according to the ionic conductivity, compared with standard laboratory LiPON.

In FIG. 3, the ionic conductivity is indicated for three electrolytes: LiPON: electrolyte of the prior art, LiPO-1: $Li_{3.6}PO_{2.3}$, LiPO-2: $Li_4PO_{2.6}$. The ratios Li/P; O/P and N/P are depicted for each of the electrolytes.

In this figure a difference can be seen in particular in ionic conductivity of the electrolytes according to the invention LiPO-1 and LiPO-2 compared with LiPON. An increase in the Li/P ratio can also be seen whereas the other ratios remain substantially stable when the ionic conductivity increases.

It should be noted that surprisingly this electrolyte according to the invention also has good electrochemical stability.

By way of example, the specific role, the chemical nature and the typical thicknesses of each layer of the microbattery are described below by way of example:

The current collectors 2 are metal and may for example be based on Pt, Cr, Au, Ti, W, Mo or Ni. The thicknesses of these current collectors 2 are preferentially between 100 nm and 1 µm, generally 250 nm. They serve to conduct the current homogeneously as far as the electrodes 3, 5.

The cathode 3 or the positive electrode may consist of $LiCoO_2$, $LiNiO_2$, $LiMn_2O_4$, CuS, $CuS_2$, $WO_yS_z$, $TiO_yS_z$, $LiTiS_2$, $Li_3TiS_3$ or $V_2O_5$. According to the materials chosen, thermal annealing may be necessary to increase the crystallisation of the films and their insertion property. This is in particular the case with lithiated oxides. Nevertheless, some amorphous materials, in particular titanium oxysulfides, do not require such treatment while allowing high insertion of lithium ions. The thickness of the cathode 3 is preferentially between 100 nm and 10 µm. The cathode 3 is the place of reduction of the lithium during the discharge of the microbattery and the oxidation thereof in charging.

The electrolyte 4 according to the invention is a good ionic conductor and electronic insulator. It is described above. The typical thickness is preferentially 1.4 µm but must be adjusted according to the thickness of the electrodes 3 and 5: it may vary between 500 nm and 3 µm.

The anode 5 may be metallic lithium deposited by thermal evaporation, a metal alloy based on lithium or an insertion compound (SiTON, $SnN_x$, $InN_x$, Si, $Li_4Ti_5O_{12}$, $SnO_2$, etc). There also exist microbatteries without anode called Li free. In this case, a layer of metal blocking the lithium is deposited. The lithium is then deposited on this layer. The thickness of the anode 5 is preferentially between 100 nm and 10 µm. The anode 5 is the seat of the oxidation of the lithium during discharge of the microbattery and of reduction during charging.

According to one embodiment, the stack described above is encapsulated. The purpose of encapsulation is to protect the active stack from the external environment and specifically from moisture. Various strategies can be used: encapsulation using thin layers, encapsulation using co-laminates, or encapsulation by housing, such as for example a glass cover held by parafilm.

According to one embodiment of the invention, the microbattery comprises a protective layer 6 of the layer comprising $Li_xPO_y$. This protective layer is intended to protect the interface between the layer comprising $Li_xPO_y$ and a metal. By way of example, this protective layer 6 is present between the layer comprising $Li_xPO_y$ and the anode 5 when the latter is metallic, such as titanium or lithium. This protective layer 6 prevents the formation of a high interface resistance detrimental to the cycling of the battery. The protective layer 6 reduces the internal resistance of the battery while keeping good electrode/electrolyte interfaces. Its thickness is preferentially at a minimum 0.5 nm and at a maximum 35% of the thickness of the layer comprising $Li_xPO_y$.

According to this embodiment, the protective layer 6 may be a solid electrolyte. The solid electrolyte of the protective layer 6 is chosen from LiPON or $Li_zSiO_w$. The protective layer 6 forms, with the layer 4 of $Li_xPO_y$, an at least dual-layer electrolyte comprising a layer comprising $Li_xPO_y$ and a protective layer of the electrolyte type. The at least dual-layer electrolyte is advantageously $Li_xPO_y$/LiPON or $Li_xPO_y$/$Li_zSiO_w$.

According to another possibility, the protective layer 6 may not be an ionic conductor such as for example $Al_2O_3$, Si, $Li_2O$ or more generally material of poor ionic conductivity, preferentially the protective layer is deposited sufficiently finely to enable lithium ions to pass.

According to another aspect, the invention concerns a method for manufacturing an electrolyte as described above. The method according to the invention comprises a step of depositing the layer comprising $Li_xPO_y$ in vapour phase. This deposition is done for example using a target of the sputtered $Li_3PO_4$ type, advantageously without the use of a magnetron. Lithium, phosphorus and oxygen are contributed by the target. According to one possibility, the sputtering is carried out under nitrogen.

Contrary to the method of the prior art, nitrogen is not integrated in the layer comprising $Li_xPO_y$. This difference is in particular due to the absence of a magnetron. Carrying out the sputtering without a magnetron makes it possible to obtain a material that is very rich in lithium, in particular Li/P≥3 and relatively depleted in oxygen, in particular O/P≤4. The Li/P ratio of the electrolyte deposited is higher than that of the target and the O/P ratio is lower than that of the target. The target may be consumed non-homogeneously. With the present invention the levels of oxygen and lithium deposited are controlled in particular by the power, the pressure and the gas used, preferentially adjusted directly on the deposition device.

According to one possibility, other gases can be used for sputtering, for example: argon, oxygen, helium, xenon, neon, krypton or a mixture of these gases, such as for example a nitrogen/argon mixture, a nitrogen/oxygen mixture or an argon/nitrogen/oxygen mixture. Preferentially, the flow rate of the gas or of the gas mixture is between 20 and 200 sccm.

Advantageously, the pressure in the chamber is between 0.5 and 30 mTorr, preferentially 4.5 mTorr. Preferentially, the substrate 1, more generally referred to as the sample, is at the floating potential. This arrangement makes it possible to obtain an electrolyte that is rich in lithium and therefore having better ionic conductivity.

EXAMPLE 1

Deposition of an electrolyte according to the invention and measurement of its performances.

The thin-layer electrolyte is deposited by PVD. The target used is $Li_3PO_4$ and sputtering is carried out under nitrogen without a magnetron.

The nitrogen flow rate is 100 sccm. The pressure in the chamber is 4.5 mTorr. The sample is at the floating potential.

Figure 4:
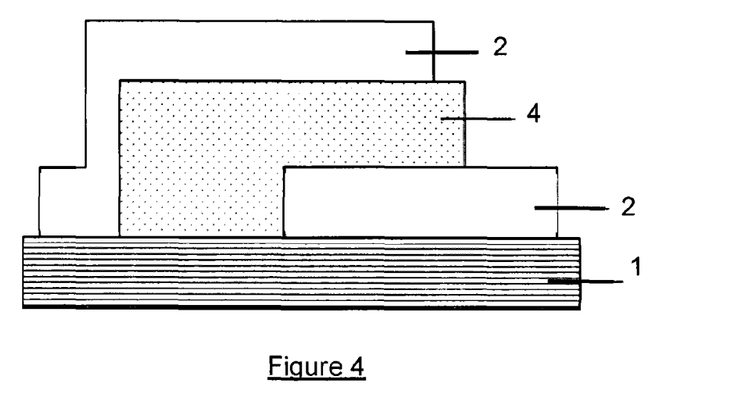
FIG. 4: Metal Insulator Metal (MIM) structure.

The electrolyte is characterised by a titanium/electrolyte/titanium MIM (Metal Insulator Metal) structure. This structure is illustrated in FIG. 4. An MIM is achieved by successive stacking of the following layers:
 a substrate 1
 a current collector 2
 an electrolyte material 3 with optionally a protective layer not depicted.
 a current collector 2

The titanium of the current collector 2 is deposited by PVD, the layers deposited are located by mechanical masking. The thickness of each current collector 2 is 250 nm and may vary between 250 nm and 500 nm. The thickness of the electrolyte 4 is 1400 and may vary between 500 nm and 2000 nm.

Figure 5A:
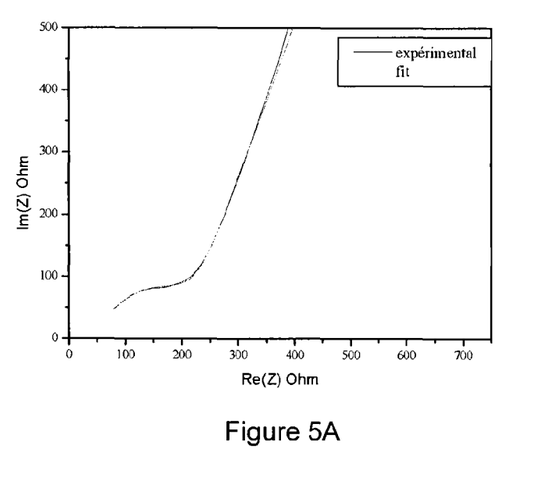
FIG. 5A: Nyquist diagram of a Ti/electrolyte/Ti MIM ($S = 0.1$ cm$^2$). Experimental curve in grey and fit in black.
Figure 5B:
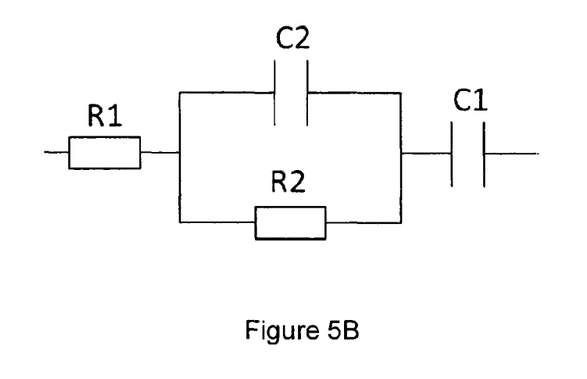
FIG. 5B: equivalent circuit use for the fit.
Figure 6:
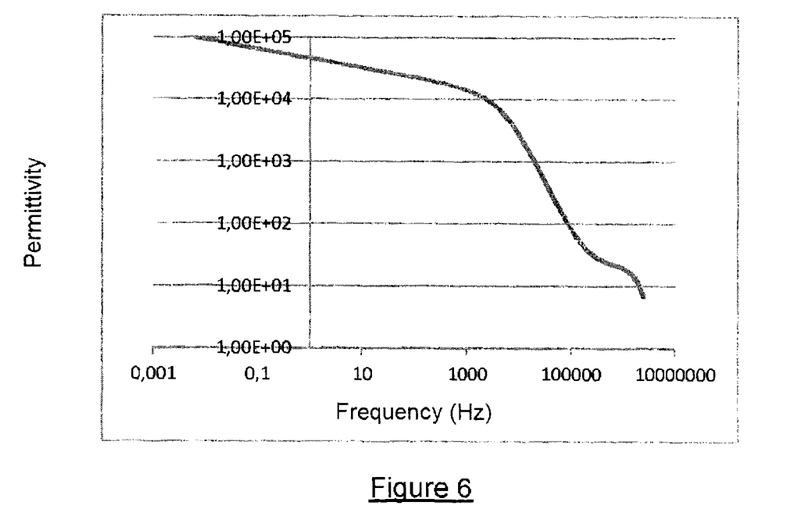
FIG. 6: relative permittivity of the $Li_4PO_{2.6}$ electrolyte as a function of frequency.

In this case, the electrolyte deposited is a layer of $Li_4PO_{2.6}$. This electrolyte is amorphous. Its ionic conductivity is measured by impedance spectroscopy between 1 MHz and 1 mHz with a deltaV of 10 mV. The curve presented in FIG. 5a is typical of an electrolyte. The value of the diameter of the semicircle makes it possible to calculate the ionic conductivity. The value of the semicircle is determined by mathematical regression by making a fit with the ECLab software from an equivalent circuit illustrated in FIG. 5b containing: as contact resistor R1 in series with a parallel circuit R2, C2 and in series with a capacitor C1. The ionic conductivity is $10^{-5}$ S/cm. The electronic conductivity is $10^{-13}$ S/cm. The permittivity is approximately $20\epsilon_0$ illustrated in FIG. 6.

EXAMPLE 2

Figure 7:
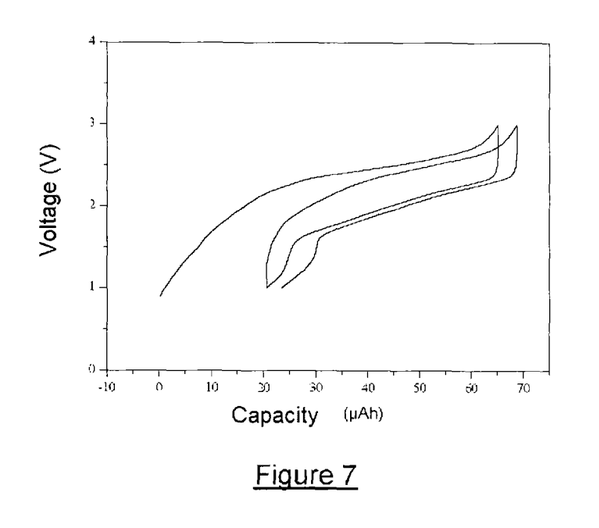
FIG. 7: cycling of an LiTiOS/LiPO/Si Li-ion battery between 1 and 3V.

In this example, the electrolyte $Li_4PO_{2.6}$ is integrated in a battery of the LiTiOS/LiPO/Si type which cycles between 1 et 3 V. The current collectors 2 are made from titanium, are 250 nm thick and are deposited by PVD. The cathode 3 is made from TiOS deposited by reactive PVD of a titanium target under $H_2S$ and the thickness of the layer is 1.2 µm. 250 nm of lithium is deposited on the TiOS cathode 2 by evaporation. It diffuses rapidly through the TiOS. The $Li_xPO_y$ electrolyte 4 is deposited in the same way as in example 1. The negative electrode, the anode 5 is made from silicon deposited by PVD of a silicon target under argon and is 10 nm thick. The battery is cycled between 1 and 3 V at 1 C. The results are illustrated in FIG. 7. It can be seen that the battery cycles correctly.

EXAMPLE 3

Figure 8:
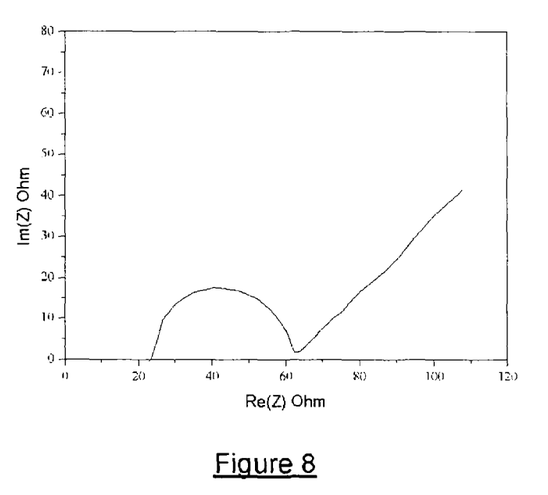
FIG. 8: Nyquist diagram of a battery with a dual-layer electrolyte according to the invention.

In this example, the $Li_4PO_{2.6}$ electrolyte is deposited as described previously and a fine layer of LiPON is deposited thereon. This fine layer forms a protective layer for the $Li_4PO_{2.6}$. The LiPON is deposited by radio-frequency PVD with a magnetron of an $Li_3PO_4$ (90% mol)-$Li_2O$—$B_2O_3$ target. The thickness of the $Li_4PO_{2.6}$ electrolyte may be 1.4 μm and that of the LiPON 100 to 500 nm. The electrolyte 4 is then formed by an LiPO/LiPON dual layer. This application reduces the internal resistance of the battery while keeping good electrode/electrolyte interfaces. The resistance of the dual-layer (LiPO+LiPON) electrolyte is 40 ohms (FIG. 8). It was measured by impedance spectrometry between 1 MHz and 1 mHz with a deltaV of 10 mV. The resistance is given by the value of the ½ circle. The same thickness of LiPON would give a resistance of 120 ohms. This dual-layer has a conductivity equivalent to $5.10^{-6}$ S/cm.

EXAMPLE 4

Figure 9:
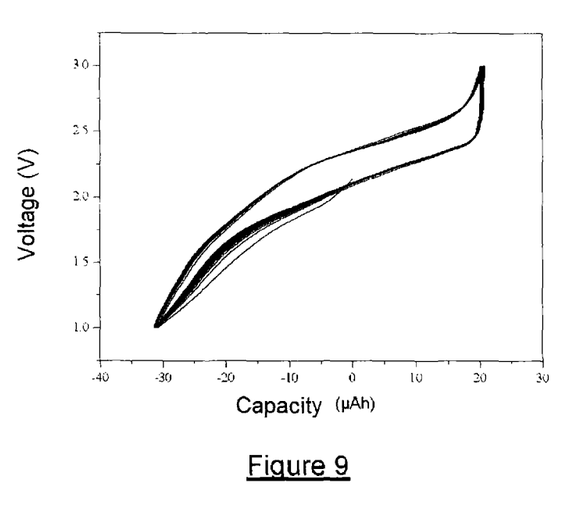
FIG. 9: cycling between 1 and 3 V of a TiOS/LiPO/LiPON/Li battery.

In this example, the LiPO/LiPON electrolyte is integrated in a battery of the TiOS/LiPO/LiPON/Li type that cycles between 1 and 3 V. The current collector 2 is made from titanium, is 250 nm thick and is deposited by PVD. The cathode 3 is made from TiOS deposited by reactive PVD of a titanium target under $H_2S$ and the thickness of the layer is 1.2 μm. The LiPO of the dual-layer electrolyte is deposited in the same way as in example 1 and measures 1.4 μm, and the LiPON of the dual-layer electrolyte is deposited as in example 3 and measures 250 nm. The anode 5 is made from lithium deposited by evaporation and is 2 μm thick. The lithium also serves as a current collector 2 on the same side as the anode 5. The battery is cycled between 1 and 3 V at 0.75 C. It can be seen in FIG. 9 that the biasing is very weak.

REFERENCES

1. Substrate
2. Current collector
3. Cathode
4. Electrolyte
5. Anode
6. Protective layer

The invention claimed is:

1. An all-solid-state microbattery, comprising:
   an anode layer,
   a cathode layer, and
   at least one solid electrolyte layer comprising $Li_xPO_y$, free from nitrogen, with $3.6 \leq x \leq 6.3$ and $1.5 \leq y \leq 4$.
2. The all-solid-state microbattery according to claim 1, in which x and y are such that the ionic conductivity is greater than or equal to $10^{-5}$ S/cm.
3. The all-solid-state microbattery according to claim 1, in which the Li/O ratio of the $Li_xPO_y$ is from greater than 1 to 4.2.
4. The all-solid-state microbattery according to claim 1, in which the solid electrolyte layer comprising the $Li_xPO_y$ is solely a layer of $Li_xPO_y$.
5. The all-solid-state microbattery according to claim 1, in which the solid electrolyte layer comprising the $Li_xPO_y$ is such that x is equal to 4 and y is equal 2.6.
6. The all-solid-state microbattery according to claim 1, in which the solid electrolyte layer comprising the $Li_xPO_y$ is such that that x is equal to 3.6 and y is equal to 2.3.
7. The all-solid-state microbattery according to claim 1, further comprising a protective layer protecting the solid electrolyte layer comprising the $Li_xPO_y$ with a minimum thickness of 0.5 nm and a maximum thickness of 35% of the thickness of the layer comprising $Li_xPO_y$.
8. The all-solid-state microbattery according to claim 7, in which the protective layer is a solid electrolyte.
9. The all-solid-state microbattery according to claim 8, in which the protective layer is a solid electrolyte selected from the group consisting of LiPON and $Li_zSiO_w$.
10. The all-solid-state microbattery according to claim 7, in which the protective layer is selected from the group consisting of $Al_2O_3$, Si and $Li_2O$.
11. A method for manufacturing the all-solid-state microbattery according to claim 1, comprising:
    depositing the cathode layer,
    physical vapour depositing the solid electrolyte layer on an $Li_3PO_4$ target sputtered under nitrogen so as to obtain a layer comprising $Li_xPO_y$, free from nitrogen, with $3.6 \leq x \leq 6.3$ and $1.5 \leq y \leq 4$, and
    depositing the anode layer.
12. The manufacturing method according to claim 11, wherein the sputtering of the $Li_3PO_4$ target is effected without a magnetron.
13. The all-solid-state microbattery according to claim 1, in which the Li/O ratio of the solid electrolyte layer of the $Li_xPO_y$ is from 1.5 to 4.2.
14. The all-solid-state microbattery according to claim 1, in which the solid electrolyte layer comprising the $Li_xPO_y$ comprises another element in a quantity below 1%.

\* \* \* \* \*